United States Patent Office 2,946,809
Patented July 26, 1960

2,946,809

17α-ALKYNYL-17β-ALKANOYLOXY-4,6-ESTRADIEN-3-ONES

Frank Benjamin Colton, Chicago, Ill., assignor to G. D. Searle & Co., Chicago, Ill., a corporation of Delaware No Drawing. Filed Feb. 13, 1959, Ser. No. 792,984

6 Claims. (Cl. 260—397.4)

The present invention relates to a new group of highly potent and long acting progestational agents and more particularly to 17α-alkynyl-17β-alkanoyloxy-4,6-estradien-3-ones of the general structural formula

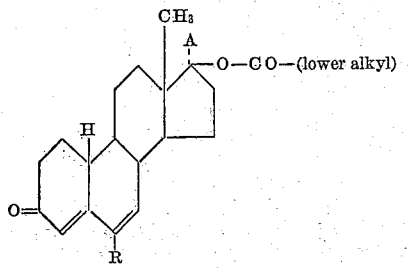

wherein A is an alkynyl radical, preferably of less than 6 carbon atoms, and R is either hydrogen or methyl group.

Among the radicals which A can represent are ethynyl, propynyl, butynyl, pentynyl and hexynyl. The lower alkyl radical above can be methyl, ethyl, straight-chain or branched propyl, butyl, pentyl and hexyl.

The compounds are long-acting, orally active progestational agents and are particularly active in the Clauberg assay. They are especially useful in the case of menstrual dysfunction due to hormonal imbalance. They have the advantage of being free from anabolic and androgenic side effects in therapeutic dosage.

The compounds of this invention are conveniently prepared by oxidizing the corresponding 3,17β-diacyloxy-17α-alkynyl-3,5-estradienes with manganese dioxide. The preparation of the manganese dioxide to be used in described hereinbelow.

The 2,17β-diacyloxy-17α-alkynyl-3,5-estradienes can be prepared from corresponding 17α-alkynyl-19-nortestosterones by treatment with the appropriate alkanoic acid anhydride in the presence of a catalytic amount of a strong acid and typically sulfuric acid, an alkane sulfonic acid such as methanesulfonic or an arylsulfonic acid such as benzenesulfonic and toluenesulfonic acid. An obvious alternative is to use as a starting material for the 3,5-estradiene the 17α-alkynyl-17β-acyloxy-4-estren-3-one which can also be treated with the alkanoic anhydride with the acid catalyst.

In carrying out the oxidation with manganese dioxide it is preferred to prepare the reagent as follows: An aqueous solution of manganous sulfate is heated on a steam bath and an alakali metal permanganate, typically potassium permanganate, is slowly added until the presence of a small excess is made evident by the fact that a purple color persists for 15 minutes. The solution is then filtered and the precipitate is thoroughly washed with water. The manganese dioxide formed is not washed with an organic solvent as frequently suggested in the literature, but is rather dried at 70° C. for several hours and in this condition it is found to be highly active and to give an excellent yield for the conversion of a 3,17-diacyloxy-3,5-estradiene to the 4,6-dien-3-one. The oxidation with manganese dioxide is conveniently carried out in such solvents as aqueous alkanoic acids; on the other hand it is also possible to carry out this reaction in such hydrocarbon solvents as benzene, toluene, xylene and the like. The manganese dioxide oxidation can likewise be carried out on the compounds which have at the 3-position a 3-alkoxy group rather than an acyloxy group.

The compounds which constitute this invention and the methods for their production will appear more fully from the examples below. However, these examples are given for the purpose of illustration only and are not to be construed as limiting the invention in spirit or in scope. In these examples quantities are given as parts by weight.

Example 1

To a solution of 3.5 parts of 17α-ethynyl-19-nortestosterone in 30 parts of isopropenyl acetate are added 0.2 part of concentrated sulfuric acid and the mixture is refluxed for 3 hours. In the course of refluxing some distillate is permitted to escape in order to remove some of the acetone formed. The mixture is then cooled to about 70° C. and 0.5 part of sodium acetate are added. The solvent is removed on the steam bath with the aid of a current of nitrogen. The residue is taken up in about 75 parts of dichloromethane. The salts are removed by filtration and the filtrate is concentrated to about 7 parts. Then 20 parts of methanol are added and the mixture is cooled to 0 C. The precipitate is collected on a filter and washed with cold methanol. The 3,17β-diacetoxy-17α-ethynyl-3,5-estradiene thus obtained is sufficiently pure for the following reaction. It melts at about 169–175° C.

To a solution of 2 parts of 3,17β-diacetoxy-17α-ethynyl-3,5-estradiene in 125 parts of glacial acetic acid and 10 parts of water are added 10.5 parts of manganese dioxide prepared as described hereinabove. The mixture is then stirred at room temperature for 80 minutes after which the manganese dioxide is removed by filtration and washed with acetic acid. Water is added to the filtrate and on cooling a precipitate is obtained which is washed with water. The product is dissolved in benzene and thus applied to a silica gel chromatography column which is developed with benzene solutions containing increasing concentrations of ethyl acetate. A 3% solution of ethyl acetate in benzene elutes a fraction which on concentration yields 17α-ethynyl-17β-acetoxy-4,6-estradien-3-one. On recrystallization from acetone and water the product melts at about 164-166° C. The ultraviolet absorption spectrum shows a maximum at 283 millimicrons with an absorption coefficient of about 27,000. The infrared spectrum shows maxima at 3.0, 5.7, 6.0, 6.2, 6.3, 6.86, 7.3 and 7.94 microns.

Example 2

A mixture of 4 parts of 3,17β-diacetoxy-17α-ethynyl-3,5-estradiene, 2 parts of sodium borohydride, 75 parts of dioxane, 50 parts of methanol and 18 parts of water is stirred at room temperature for 45 minutes after which 300 parts of water are added. The mixture is cooled to 0° C. and the resulting precipitate is collected on a filter, washed and dried.

To a mixture of 3.3 parts of the 17α-ethynyl-17β-acetoxy-5-estren-3-ol thus obtained and 6 parts of benzoquinone in 90 parts of refluxing toluene is added a solution of 3 parts of aluminum isopropoxide in 40 parts of toluene. After refluxing for 40 minutes the mixture is cooled and steam distilled. The resulting precipitate is collected on a filter and extracted with ether. This extract is washed with sodium bicarbonate and water, dried and concentrated. Chromatography as in the preceding example and recrystallization from acetone and water yields 17α-ethynyl-17β-acetoxy-4,6-estradien-3-one melting at about 165–167° C.

*Example 3*

To a mixture of 2.5 parts of 17α-(1-propynyl)-19-nortestosterone and 25 parts of isopropenyl acetate are added 0.2 part of concentrated sulfuric acid. The mixture is refluxed for 3 hours in the course of which distillate is allowed to escape in order to remove some of the acetone formed. The mixture is then cooled to about 70° C., treated with 0.5 part of sodium acetate, and the solvent is removed in vacuo. The residue is extracted with 60 parts of dichloromethane. The extract is concentrated to about 7 parts and treated with 20 parts of methanol. After cooling the precipitate formed is collected on a filter and washed with cold methanol until it is colorless. On drying there is obtained 3,17β-diacetoxy-17α-(1-propynyl)-3,5-estradiene of sufficient purity for use in the following procedure. Crystallization of a sample from acetone produces material melting at about 177–182° C. The infrared spectrum determined in a potassium bromide disc shows maxima at about 5.71, 6.1, 7.27, 7.93, 8.2, 8.75, 8.9, 9.9, 10.1, 10.57 and 10.8 microns. An ultraviolet maximum at about 234–235 millimicrons shows a molecular extinction coefficient of about 20,000.

To a solution of 1.5 parts of 3,17β-diacetoxy-17α-(1-propynyl)-3,5-estradiene in 70 parts of acetic acid and 6 parts of water are added 7.5 parts of manganese dioxide and the mixture is agitated for 80 minutes. The precipitate is collected on a filter, washed with acetic acid and then discarded. The filtrate is diluted with about 300 parts of water and the precipitate is collected on a filter and washed with water. This material is taken up in benzene and thus applied to a chromatography column charged with silica gel. The column is developed with benzene solutions containing increasing concentrations of ethyl acetate. A 3% solution of ethyl acetate in benzene yields an eluate which is concentrated and the 17α-(1-propynyl)-17β-acetoxy-4,6-estradien-3-one thus obtained is recrystallized from acetone and water. It melts at about 189–191° C. The ultraviolet absorption spectrum shows a maximum at about 283 millimicrons with a molecular extinction coefficient of about 26,400. Infrared maxima are observed at 4.27, 4.45, 5.72, 6.01, 6.18, 6.31, 6.87, 7.30, 7.51, 7.73, 7.94, 8.93, 9.82, 10.3 and 11.3 microns. The compound has the structural formula

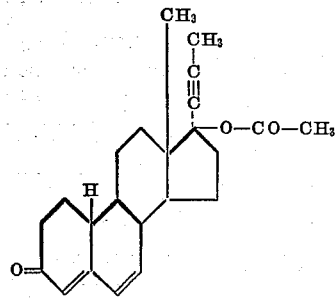

*Example 4*

A solution of 6 parts of 1-butyne and 40 parts of cold ether is added portionwise in the course of 30 minutes to a solution of butyl lithium prepared from 17.3 parts of 1-bromobutane and 2.2 parts of lithium wire in 27 parts of ether. After completion of the addition the mixture is stirred for 90 minutes at 0° C. To this solution of butynyl lithium in ether are added in the course of about 30 minutes, 10 parts of 3-methoxy-2,5(10)-estradien-17-one in 100 parts of tetrahydrofuran in small portions. After completion of the addition the ether is removed by heating at 55° C. but the volume is maintained essentially constant by replacing the ether with tetrahydrofuran. The mixture is then refluxed for 3 hours, poured into ice water and chilled. The oily layer is separated, dissolved in ether, washed with water and then with saturated sodium chloride solution. After drying, the solution is filtered and concentrated under vacuum to yield the oily 3-methoxy-17α-(1-butynyl)-2,5(10)-estradien-17β-ol. The oily product is dissolved in 80 parts of methanol and then there is added a mixture of 4 parts of concentrated hydrochloric acid and 10 parts of water. The mixture is permitted to stand at 50° C. for 30 minutes and then 1000 parts of water are slowly added. On cooling there is obtained 17-(1-butynyl)-19-nortestosterone, melting at about 134–137° C. The ultraviolet absorption spectrum shows a maximum at about 240 millimicrons with a molecular extinction coefficient of about 17,500. Infrared maxima are observed at about 2.75, 3.38, 3.45, 6.0 and 6.16 microns.

A mixture of 2.5 parts of this product and 25 parts of isopropenyl acetate is treated with 0.2 parts of concentrated sulfuric acid and refluxed for 4 hours with occasional distillation of the acetone formed. After cooling to about 70° C. 0.5 part of sodium acetate are added and the mixture is distilled in vacuo. The residue is extracted with dichloromethane, concentrated, treated with methanol and cooled to yield 3,17β-diacetoxy-17α-(1-butynyl)-3,5-estradiene of sufficient purity for direct use in the procedure below. Infrared maxima are observed at 5.76, 6.1, 7.95 and 8.2 microns. The ultraviolet absorption spectrum shows a maximum at about 235 millimicrons with a molecular extinction coefficient of about 19,000.

A mixture of 2 parts of 3,17β-diacetoxy-17α-(1-butynyl)-3,5-estradiene in 130 parts of acetic acid and 10 parts of water is treated with 12 parts of the manganese dioxide preparation and after turbination at 2 hours the mixture is filtered and the precipitate is washed with acetic acid. The filtrate is diluted with water. The resulting precipitate is taken up in benzene and the solution is applied to a chromatography column charged with silica gel. The column is developed with benzene and benzene solutions containing increasing concentrations of ethyl acetate in benzene. Elution with a 2% solution of ethyl acetate in benzene and concentration of the eluate yields 17α-(1-butynyl)-17β-acetoxy-4,6-estradien-3-one. The ultraviolet absorption spectrum shows a maximum at about 283 millimicrons with a molecular extinction coefficient of about 27,000. Infrared maxima are observed at about 4.4, 5.7, 6.0, 6.17, 6.3 and 8 microns.

*Example 5*

A stirred mixture of 5.7 parts of 3-methoxy-2,5(10)-estradien-17-one in 300 parts of liquid ammonia and 2 parts of sodamide is treated with 5 parts 1-hexyne. Stirring is continued for four hours and then the mixture is treated with 6 parts of powdered ammonium chloride. After standing at about 25° C. until most of the ammonia has escaped, ether and water are added. The ether layer is separated, washed with water, dried over sodium sulfate, filtered and concentrated under vacuum. The residue is crystallized from a mixture of ether and methanol. A mixture of 5 parts of the 17α-(1-hexynyl)-3-methoxy-2,5(10)-estradien-17-ol thus obtained, 100 parts of methanol, 15 parts of water and 5 parts of concentrated hydrochloric acid is maintained at room temperature for 100 minutes and then treated with a sufficient amount of water to cause turbidity. On chilling the 17-(1-hexynyl)-19-nortestosterone precipitates which is recrystallized repeatedly from a mixture of acetone and petroleum ether. It melts at about 140–142° C.

This compound is dissolved in isopropenyl acetate and treated with sulfuric acid by the procedure of the preceding example to yield 3,17β-diacetoxy-17α-(1-hexynyl)-3,5-estradiene. The ultraviolet absorption spectrum shows a maximum at about 235 millimicrons with a molecular extinction coefficient of about 19,000. Infrared maxima are observed at about 4.4, 5.71, 6.1 and 8 microns.

Treatment with the manganese dioxide reagent by the preceding example yields 17α-(1-hexynyl)-17β-acetoxy-4,6-estradien-3-one. The ultraviolet absorption spectrum shows a maximum at about 283 millimicrons with a molecular extinction coefficient of about 27,000. Infrared maxima are observed at about 4.4, 5.76, 6.2, 6.3 and 8 microns.

*Example 6*

To a solution of 130 parts of 3-methoxy-19-nor-2,5(10)-androsten-17β-ol in 2200 parts of benzene and 516 parts of ethylene glycol are added 3 parts of p-toluenesulfonic acid monohydrate. The mixture is stirred and refluxed with a water separator in the vapor path for about 24 hours. The mixture is cooled and then 1000 parts of a 5% aqueous solution of sodium bicarbonate are added with stirring. The organic layer is separated, washed with water and then a small portion of ethanol is added. The solution is vacuum distilled to dryness and the residue is recrystallized from a mixture of methanol and water to yield 3-ethylenedioxy-19-nor-5-androsten-17β-ol melting at about 137.5–139° C.

A mixture of 45 parts of 17β-hydroxy-19-nor-4-androsten-3-one, 1190 parts of benzene, 500 parts of ethylene glycol and 1.35 parts of p-toluenesulfonic acid is treated in the same manner as in the foregoing paragraph of this example to yield the same 3-ethylenedioxy-19-nor-5-androsten-17β-ol.

A solution of 31 parts of 3-ethylenedioxy-19-nor-5(6)-androsten-17β-ol in 294 parts of pyridine and 162 parts of acetic anhydride is allowed to stand at room temperature for about 15 hours. The solution is then diluted with 2000 parts of water and the solid is collected by filtration and washed with water. Upon recrystallization from a mixture of acetone and water, and then from diisopropyl ether there is obtained 3-ethylenedioxy-17β-acetoxy-19-nor-5(6)-androstene melting at about 173–175.5° C.

To the slurry obtained by the addition of 0.9 part of anhydrous sodium acetate to a solution of 3.65 parts of 3-ethylenedioxy-17β-acetoxy-19-nor-5(6)-androstene in 45 parts of benzene are added with stirring 39.7 parts of a 0.28 M solution of peroxybenzoic acid in benzene. The mixture is protected from atmospheric moisture and stirred for 4 hours at room temperature. The mixture is washed with a 2% aqueous solution of sodium carbonate until the washings are basic and then with water. The resulting benzene solution is evaporated to dryness under vacuum. The residue is recrystallized from diisopropyl ether to yield 3-ethylenedioxy-5α,6α-epoxy-17β-acetoxy-19-norandrostane melting at about 170–171° C.

To a solution of 0.8 part of 3-ethylenedioxy-5α,6α-epoxy-17β-acetoxy-19-norandrostane in 110 parts of tetrahydrofuran are added 17 parts of a 3 molar solution of methylmagnesium bromide in ethyl ether. The solvent is distilled from the reaction mixture until the temperature reaches 60° C., whereupon the mixture is refluxed for 24 hours while it is protected from atmospheric moisture. The excess Grignard reagent is decomposed by the addition of water, and the mixture is extracted with ether. The ethereal solution is washed with water, dried over anhydrous sodium sulfate, filtered, and evaporated to dryness. The residue is recrystallized from diisopropyl ether to yield 3-ethylenedioxy-6β-methyl-19-norandrostane-5α,17β-diol showing a double melting point at 111–112.5° C. and 140° C.

To a solution of 0.20 part of 3-ethylenedioxy-6β-methyl-19-norandrostane-5α,17β-diol in 8.6 parts of toluene and 1.9 parts of cyclohexanone is added a solution of 0.14 part of aluminum isopropoxide in 3.4 parts of toluene. The mixture is refluxed for about 30 minutes and then 2 parts of a saturated aqueous solution of potassium sodium tartrate are added. The solvents are removed by steam distillation. The product is collected on a filter and upon recrystallization from diisopropyl ether, there is obtained pure 3-ethylenedioxy-5α-hydroxy-6β-methyl-19-norandrostan-17-one melting at about 163–165° C.

A mixture of 9 parts of finely divided potassium hydroxide in 50 parts of dimethyl ether of diethylene glycol and 2.5 parts of the monoethyl ether of diethylene glycol is cooled to —5° C. and then saturated with acetylene gas. To this mixture is added a solution of 1.5 parts of 3-ethylenedioxy-5α-hydroxy-6β-methyl-19-norandrostan-17-one in 10 parts of the dimethyl ether of diethylene glycol. The reaction mixture is stirred at —5° C. and acetylene gas is passed through the solution for an additional 90 minutes. Then about 400 parts of water are added and the product is collected by filtration. Upon recrystallization from aqueous methanol there is obtained 3-ethylenedioxy-6β-methyl-17α-ethynyl-19-norandrostane-5α,17β-diol melting at about 183–184° C.

A solution of 7.4 parts of 3-ethylenedioxy-6β-methyl-17α-ethynyl-19-norandrostane-5α,17β-diol in 85 parts of tetrahydrofuran is refluxed for 5 hours with 25 parts of a solution of ethylmagnesium bromide in ether. Then 14.2 parts of methyl iodide are added and the solution is refluxed for 6 hours. The solution is allowed to stand for 15 hours at room temperature and then the excess Grignard reagent is destroyed by the slow addition of about 300 parts of water. The aqueous layer is separated and extracted with ethyl acetate. The organic extracts are combined, washed with saturated sodium chloride solution and vacuum distilled to dryness.

This residue, 3-ethylenedioxy-6β-methyl-17α-(1-propynyl)-19-norandrostane-5α,17β-diol, is taken up in 40 parts of methanol and 2 parts of concentrated hydrochloric acid in 5 parts of water are added. The solution is allowed to stand at room temperature for 6 hours and then 300 parts of water are added. The mixture is extracted with ether; the extract is washed with a 5% aqueous sodium bicarbonate solution and water and then dried over sodium sulfate. The solvent is removed by vacuum distillation and the residue is taken up in benzene and applied to a chromatography column containing silica gel. The column is developed with benzene and benzene solutions containing an increasing amount of ethyl acetate. Upon elution with a 5% solution of ethyl acetate in benzene and recrystallization from diisopropyl ether there is obtained 6α-methyl-17α-(1-propynyl)-19-nortestosterone. The product shows absorption in the ultraviolet at 241 millimicrons with an extinction coefficient of 16,000. Absorption bands in the infrared are observed at 2.80, 6.00 and 6.18 microns.

A mixture of 2.5 parts of 6-methyl-17α-(1-propynyl)-19-nortestosterone and 25 parts of isopropenyl acetate is treated with 0.2 part of concentrated sulfuric acid and the mixture is refluxed for 4 hours. During this period some of the acetone formed is distilled off. The mixture is then cooled, treated with 0.4 part of sodium acetate and the solvent removed on a steam bath with the aid of a current of nitrogen. The residue is extracted with 60 parts of dichloromethane, concentrated to about ⅒ of its original volume and diluted with 20 parts of methanol. After chilling the precipitate is collected on a filter and washed with cold methanol until it becomes colorless. There is thus obtained 3,17β-diacetoxy-6-methyl-17α-(1-propynyl)-3,5-estradiene. The ultraviolet absorption spectrum shows a maximum at about 244 millimicrons with a molecular extinction coefficient of about 19,000. Infrared maxima are observed at about 4.4, 5.74, 6.0, 6.1 and 8 microns.

To a solution of 2 parts of 3,17β-diacetoxy-6-methyl-17α-(1-propynyl)-3,5-estradiene, 150 parts of acetic acid and 10 parts of water are added 12 parts of manganese dioxide and after agitation for 2 hours the mixture is filtered. The filtrate is diluted with water and the resulting precipitate is collected on a filter and taken up in benzene. This benzene solution is applied to a chromatography column filled with silica gel. On elution with a 2% solution of ethyl acetate in benzene and evaporation of the eluate there is obtained as a residue 6-methyl-17α-(1-propynyl)-17β-acetoxy - 4,6 - estradien-3-one. The ultraviolet absorption spectrum shows a maximum at about 289 millimicrons with a molecular extinction coefficient of about 27,000. Infrared maxima are observed at about 5.7, 6.0, 6.1, 6.3 and 7.9 microns.

*Example 7*

A mixture of 1 part of 17α-(1-propynyl)-19-nortestosterone, 5 parts of hexanoic anhydride and 0.1 part of p-toluenesulfonic acid monohydrate is heated at 120° for 12 hours, cooled and poured under ice water. After standing for 5 hours the mixture is extracted with ether. The ether extract is washed successively with sodium bicarbonate, water and saturated aqueous sodium chloride solution, dried over anhydrous sodium sulfate, and concentrated. The crude 3,17β-hexanoyloxy-17α-(1-propynyl)-3,5-estradiene (1 part) is mixed with 50 parts of acetic acid and 5 parts of water and then treated with 5 parts of the manganese dioxide preparation. The mixture is agitated for 3 hours and then filtered. The filtrate is diluted with water and the resulting precipitate is taken up in benzene solution and applied to a silica gel chromatography column. Elution with benzene and recrystallization of the material obtained by evaporation of the eluate yields 17α-(1-propynyl)-17β-hexanoyloxy-4,6-estradien-3-one which is recrystallized from a mixture of acetone and petroleum ether. The ultraviolet absorption spectrum shows a maximum at about 283 millimicrons with a molecular extinction coefficient of about 27,000. Infrared maxima are observed at 4.4, 5.76, 6.2, 6.3 and 8 microns.

Substitution of the 6α-methyl-17α-(1-propynyl)-19-nortestosterone as the starting material yields under identical conditions the 6-methyl-17α-(1-propynyl)-17β-hexanoyloxy-4,6-estradien-3-one. Infrared maxima are observed at 5.76, 6.0, 6.18, 6.31 and 7.9 microns.

The compound has the structural formula

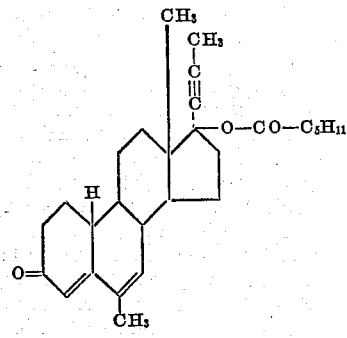

*Example 8*

A solution of 0.47 part of 3-ethylenedioxy-17α-ethynyl-6β-methyl-19-norandrostane-5α,17β-diol, 18 parts of glacial acetic acid and 4.5 parts of water is heated for about 15 minutes on a steam bath and then diluted to a volume of about 150 parts with water. The solid is collected by filtration and upon recrystallization from a mixture of acetone and water and then from diisopropyl ether there is obtained 5α,17β-dihydroxy-17α-ethynyl-6β-methyl-19-norandrostan-3-one melting at about 208–211° C.

A solution of 0.4 part of 5α,17β-dihydroxy-17α-ethynyl-6β-methyl-19-norandrostan -3-one in 16 parts of ethanol and 4 parts of 0.1 —N sodium hydroxide solution is refluxed under a nitrogen atmosphere for about 4 hours. The solution is then diluted with water to incipient crystallization and, after cooling, the compound is collected by filtration. There is thus obtained 6α-methyl-17α-ethynyl-19-nortestosterone.

A mixture of 5 parts of this steroid and 50 parts of isopropenyl acetate is treated with 0.4 part of concentrated sulfuric acid and the reaction mixture is refluxed for 3 hours. During this time some of the acetone formed is permitted to escape. The mixture is then cooled to 70° C., treated with 0.8 part of sodium acetate and steam distilled. The residue is extracted with 120 parts of dichloromethane and the extract is concentrated to one-tenth of its original volume and diluted with 50 parts of methanol. After cooling the precipitate is collected on a filter. The crude 3,17β-diacetoxy-6-methyl-17α-ethynyl-3,5-estradiene thus obtained is suitable for the following reaction. The compound shows maxima at 4.4, 5.7, 6.0, 6.1 and 8 microns in the infrared region and a maximum at about 244 millimicrons with a molecular extinction coefficient of about 19,000 in the ultraviolet.

A mixture of 2 parts of this product, 150 parts of acetic acid and 10 parts of water is treated with 12 parts of manganese dioxide and the mixture is agitated for 2 hours and filtered. The filtrate is diluted with water and the precipitate is collected on a filter and taken up in benzene. The benzene solution is applied to a chromatography column which is developed with benzene and benzene solutions containing increasing amounts of ethyl acetate. Elution with a 3% solution of ethyl acetate in benzene and concentration of the eluate yields 6-methyl-17α-ethynyl-17β-acetoxy-4,6-estradien-3-one. An ultraviolet maximum is observed at about 289 millimicrons with a molecular extinction coefficient of about 26,500. Infrared maxima are observed at about 4.4, 5.7, 6.00, 6.15, 6.3 and 7.95 microns.

What is claimed is:

1. A compound of the structural formula

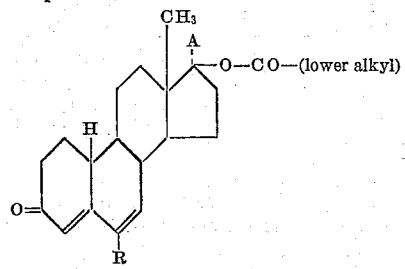

wherein A is an alkynyl radical of less than six carbon atoms and R is a member of the class consisting of hydrogen and methyl.

2. A compound of the structural formula

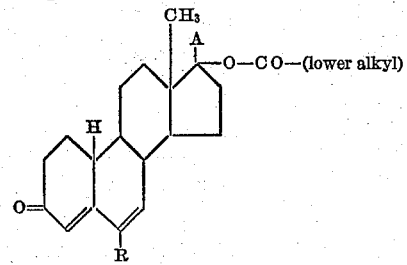

wherein A is an alkynyl radical of less than six carbon atoms.

3. 17α-ethynyl-17β-acetoxy-4,6-estradien-3-one.
4. 17α-(1-propynyl)-17β-acetoxy-4,6-estradien-3-one.
5. 17α-(1-butynyl)-17β-acetoxy-4,6-estradien-3-one.
6. 6 - methyl - 17α - (1 - propynyl) - 17β - acetoxy-4,6-estradien-3-one.

References Cited in the file of this patent

UNITED STATES PATENTS 2,744,122    Djerassi et al.       May 1, 1956
2,874,170    Colton       Feb. 17, 1959

OTHER REFERENCES

Pincus: Recent Progress in Hormone Research, vol. XIV (1958), page 40.

UNITED STATES PATENT OFFICE
CERTIFICATE OF CORRECTION

Patent No. 2,946,809  July 26, 1960

Frank Benjamin Colton

It is hereby certified that error appears in the printed specification of the above numbered patent requiring correction and that the said Letters Patent should read as corrected below.

Column 1, line 47, for "in described" read -- is described --; line 48, for "2,17β" read -- 3,17β --; lines 69 and 70, for "severeal" read -- several --; column 6, line 12, for "dimethylene" read -- diethylene --.

Signed and sealed this 10th day of January 1961.

(SEAL)
Attest:

KARL H. AXLINE
Attesting Officer

ROBERT C. WATSON
Commissioner of Patents